LOUDSPEAKING TELEPHONE WITH ELECTRONIC VOICE SWITCHING

Filed Oct. 5, 1959

*INVENTOR.*
ROBERT T. CLEARY
*BY* C. A. Gulbrandsen
ATTY.

LOUDSPEAKING TELEPHONE WITH ELECTRONIC VOICE SWITCHING

Filed Oct. 5, 1959 4 Sheets-Sheet 2

INVENTOR.
ROBERT T. CLEARY
BY
C. A. Gulbrandsen
ATTY.

LOUDSPEAKING TELEPHONE WITH ELECTRONIC VOICE SWITCHING

Filed Oct. 5, 1959

INVENTOR.
ROBERT T. CLEARY

BY C. A. Gulbrandsen

ATTY.

INVENTOR.
ROBERT T. CLEARY
BY C. A. Gulbrandsen
ATTY.

United States Patent Office 3,136,864
Patented June 9, 1964

3,136,864
LOUDSPEAKING TELEPHONE WITH ELECTRONIC VOICE SWITCHING

Robert T. Cleary, Lockport, Ill., assignor to Automatic Electric Laboratories, Inc., a corporation of Delaware
Filed Oct. 5, 1959, Ser. No. 844,393
10 Claims. (Cl. 179—81)

This invention relates to loudspeaking telephone systems, and more particularly, to voice switching control means applicable for use in systems such as a loudspeaking telephone.

Voice switching loudspeaking telephones must be capable of switching rapidly from one direction of transmission to another, that is, they must be capable of switching the direction of transmission from the microphone channel to the loudspeaker channel, or in the opposite direction, with no clipping of the speech channels. Prior voice switching loudspeaking telephones have employed relay combinations or flip-flop circuits to accomplish this switching, and have experienced several difficulties with these arrangements. For example, the flip-flop circuits are normally in one established state allowing one or the other of the two channels to be at a high gain while the other is at a low gain, that is, the amplifiers in one of the channels are expanded while the amplifiers in the other of the two channels are compressed, the speech signals in that channel being greatly attenuated. The terms expanded and compressed as used herein only refer to the gain condition of the transmitting and receiving channels and should not be assumed to imply a non-linear system. Control signals derived from the speech signals in the two channels cause the flip-flop circuits to assume the other of the two states thereby altering the gain in the two channels. A number of means, such as, resistor-capacitor combinations having a comparatively short time constant and automatic volume controls, have had to be devised to improve the switching speed of these voice switching arrangements to prevent the clipping of the speech signals.

On the other hand, the two channels must be prevented from switching during conversation, that is, during momentary pauses in conversation or between syllables of words. To bridge these gaps in conversation circuits having a longer time constant must be employed, otherwise the two channels would revert to their normal states during each pause and be required to switch back again to the desired direction of transmission. This, of course, has a detrimental effect on the switching speed.

Also, ambient noise in the immediate vicinity of a voice switching loudspeaking telephone employing a flip-flop circuit may cause the microphone channel to assume control over the normally high gain conditioned loudspeaker channel. Under such conditions the amplifiers in the microphone channel will be at a high gain while the amplifiers in the loudspeaker channel will be at a low gain with the incoming speech signals greatly attenuated. Since the control signals are derived from the speech signals, and with the speech signals in the loudspeaker channel greatly attenuated, the loudspeaker channel can not overcome the control exercised by the microphone channel until sufficient control signals are available to counteract the control signals derived from the speech signals in the microphone channel.

It is the principal object of this invention to provide new and improved voice switching control means to overcome these prior difficulties.

It is a further object of this invention to provide new and improved electronic voice switching control means for a loudspeaking telephone whereby greater gain in both the microphone and loudspeaker channel is possible while echo and singing is prevented.

According to the principal feature of this invention, the voice-switched control circuit has two input connections over which voice controlled signals are derived from the outgoing channel and the incoming channel, respectively. The voice-switched control circuit automatically expands one and compresses the other of the two channels by means of an output connection extending to each channel as a substantially continuous function of the voice controlled signals derived over the two input connections.

A further feature of this invention is the regenerative action in the incoming channel which facilitates the switching of gain of the amplifiers in the two channels, respectively. A portion of the output signal of the amplifier in the incoming channel is coupled to the voice-switched control circuit to prevent the amplifier in the outgoing channel from assuming control over the first-mentioned amplifier. One aspect of this arrangement is that it allows this amplifier to assume control over the amplifier in the outgoing channel when the noise in the outgoing channel—e.g., ambient noise reaching the microphone of a loudspeaking telephone—causes the direction of transmission in the two channels to change.

Taking again the example of a loudspeaking telephone, another aspect of this regenerative feature is that it allows the use of a large decay time constant in the microphone channel to prevent the loudspeaker channel from switching from a low gain to a high gain during momentary pauses in the conversation or between word syllables. Without such a provision, if the distant party would speak immediately after transmission by the local party the loudspeaker amplifier would fail to switch to a high gain immediately, clipping the speech signals. The regenerative action of this invention prevents this clipping by facilitating the immediate increase to a high gain of the loudspeaker amplifier and the simultaneous decrease to a low gain of the microphone amplifier.

A further feature of this invention is the use of two diodes in series in each leg of the microphone control portion of the diode-capacitor bridge of the voice-switched control circuit. The employment of two diodes in series assures that the loudspeaker amplifier is compressed before the microphone amplifier is expanded. This eliminates "singing" due to the acoustic coupling of the two channels since the loop gain can never become larger in the intermediate positions than in either of the end positions.

The invention, both as to its organization and method of operation, together with other objects and features thereof not specifically mentioned, will best be understood by reference to the following specification taken in connection with the accompanying drawings. In these drawings.

Figure 3:
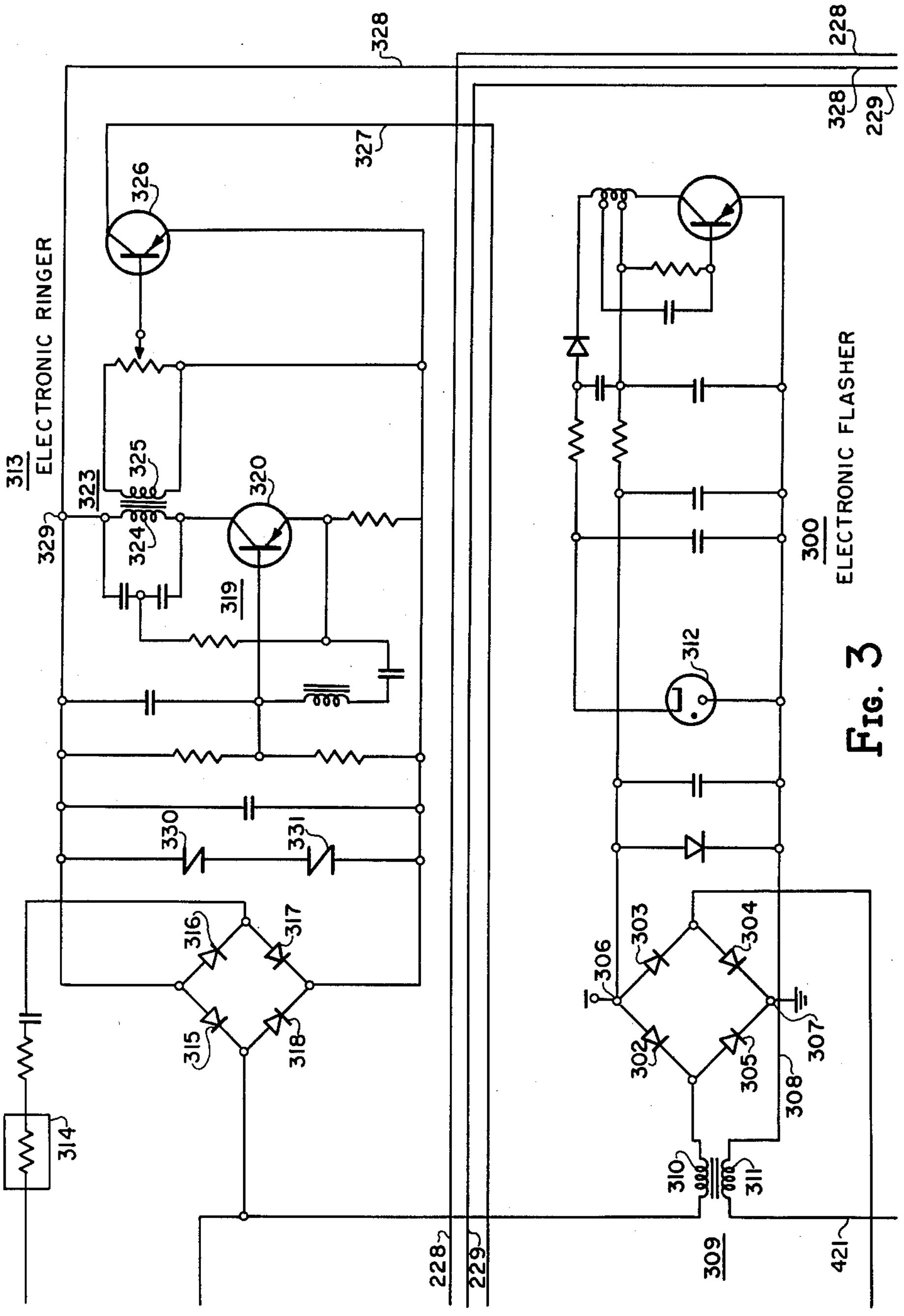
FIG. 3 shows the electronic ringer and the electronic flasher circuits used in this embodiment. Also shown is the power supply for the loudspeaking portion for the system.
Figure 4:
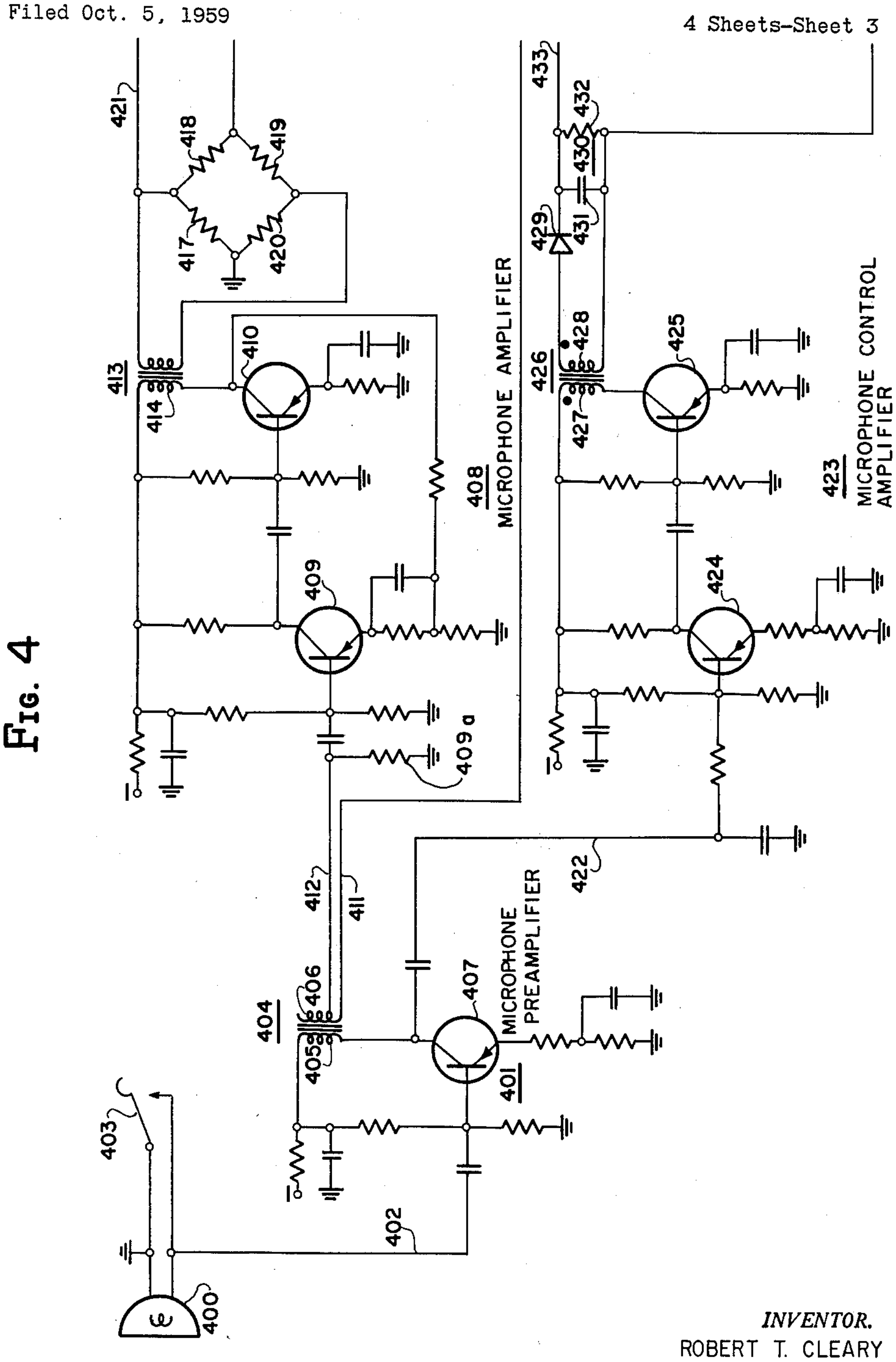
FIG. 4 shows the circuit arrangement of the microphone channel and the resistance hybrid.
Figure 5:
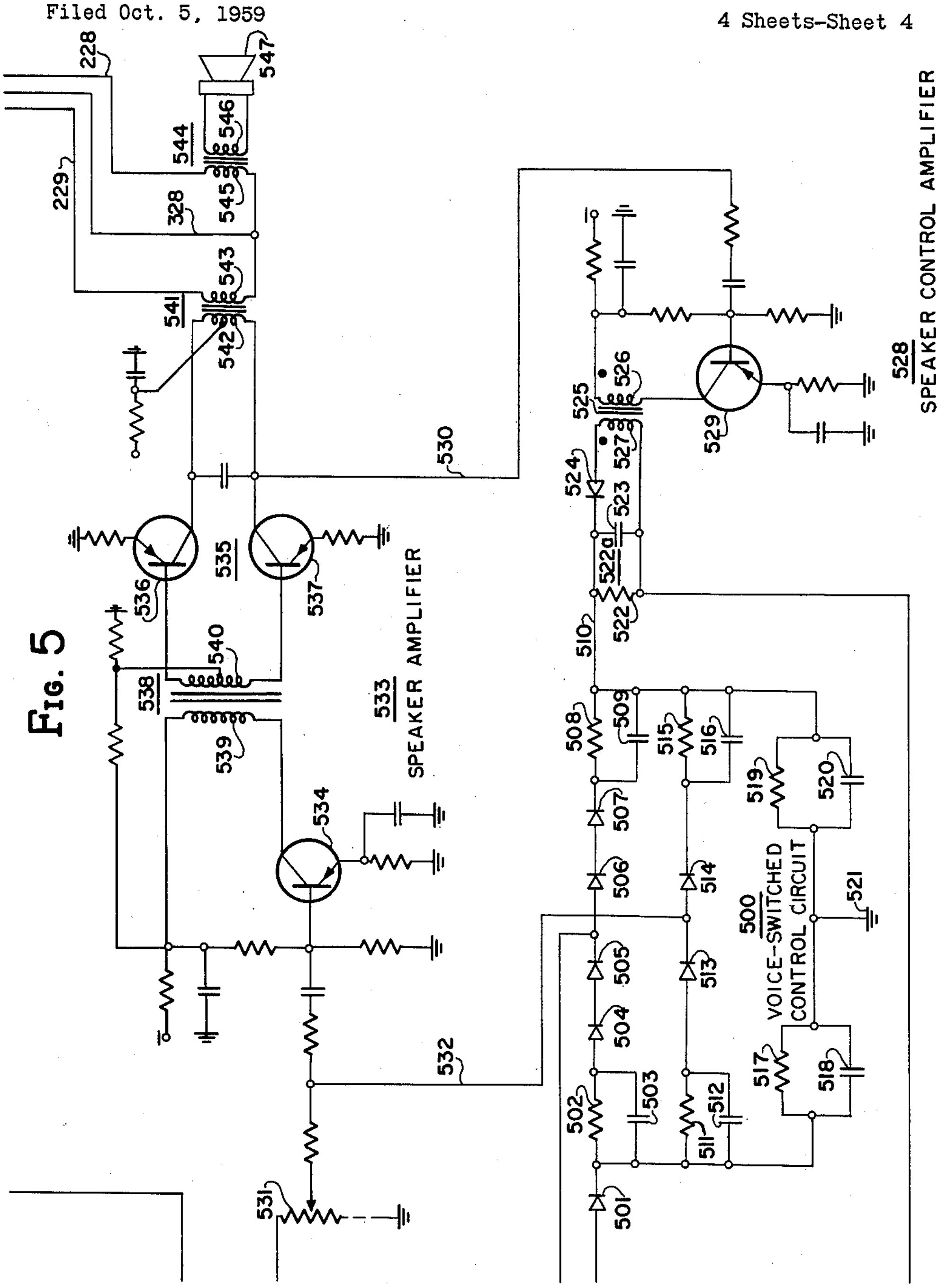
FIG. 5 shows the circuit arrangement of the voice-switched and the loudspeaker channel.

In referring to FIGS. 1–5, it may be noted that the first digit of reference numerals indicate the figure in which the components are principally shown, for example, voice-switched control circuit 500 is shown in FIG. 5 and microphone control amplifier 423 is shown in FIG. 4. Conductors extending from one sheet to another are indicated by the same reference numeral on all sheets.

The embodiment of this invention shown in FIGS. 2–5 may be regarded as an improvement of the transistorized loudspeaking telephone disclosed in copending patent application Serial No. 634,184, filed by Cleary et al. on January. 1, 1957, now United States Patent 3,028,452 granted April 3, 1962, voice switching control having been added by the present invention to the earlier disclosure.

Figures 1, 2:
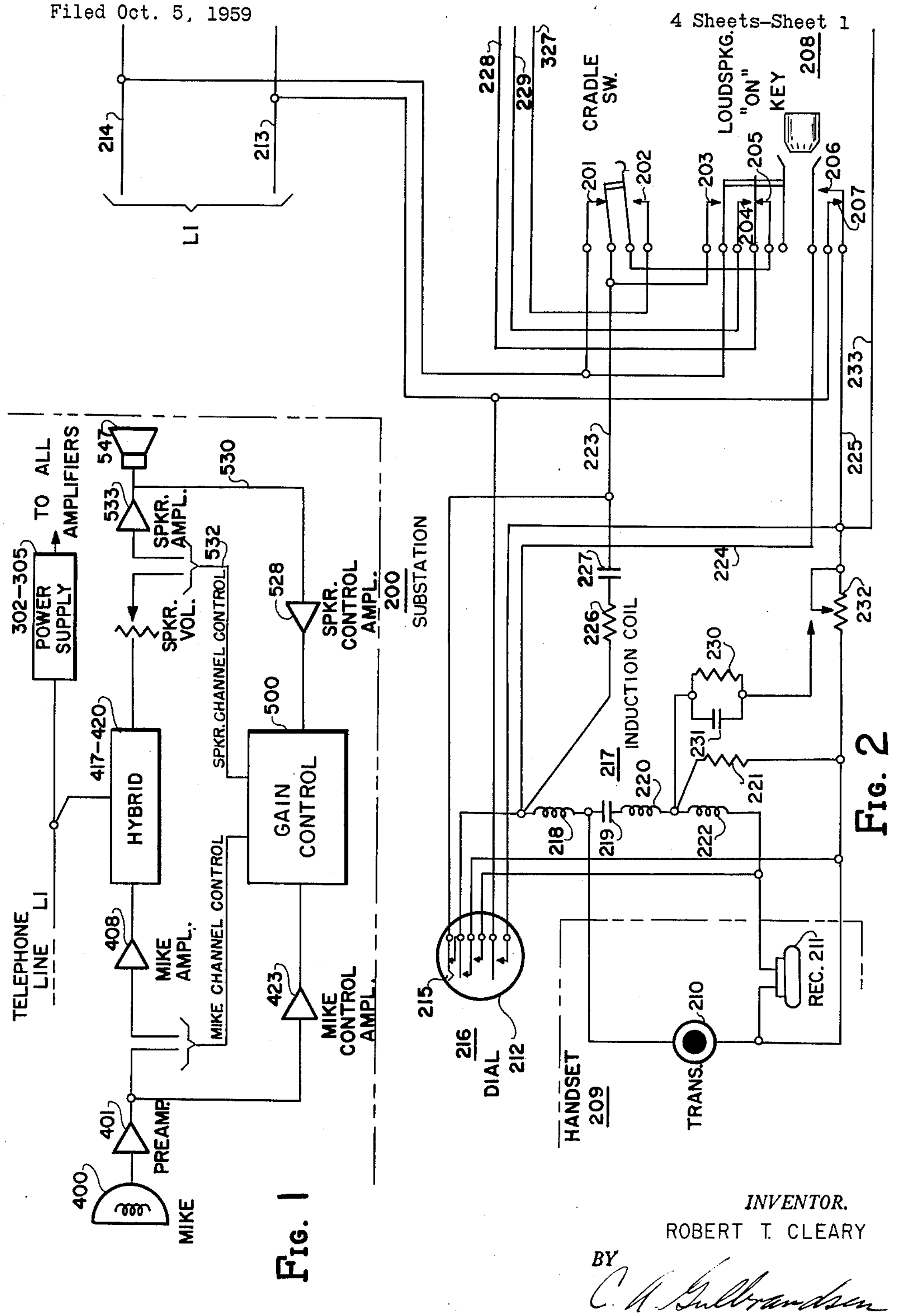
FIG. 1 is the loudspeaking portion of the telephone subset shown in block diagram form.
FIG. 2 is the schematic diagram of the selective loudspeaking telephone subset.

The circuit arrangement, FIGS. 2–5, of the present loudspeaking telephone will be described first, with a brief description of the operation of the telephone as illustrated in FIG. 1 following. Referring to FIG. 2, the transmission circuit shown in the left-hand portion of this figure is patterned after the transmission circuit disclosed in co-pending U.S. patent application Serial No. 592,401, filed by H. L. Pye on June 19, 1956 now United States Patent 2,912,512 granted November 10, 1959. The transmission circuit includes an anti-sidetone induction coil 217 having a line winding 218, another winding 220 and an anti-sidetone winding 222, all connected in an aiding sense with respect to each other. The transmission circuit further includes a blocking condenser and a balancing impedance 221. Rheostat 232 serves as a line compensating resistance, and resistance 230 and condenser 231 form an auxiliary balancing network. Transmitter 210 and receiver 211 are the two talking transducers which are mounted in the handset 209 of the substation 200.

As shown in FIG. 2, cradle switch 201—202 includes a line contact 201 which closes the line loop when the handset is removed from the cradle. Contact 202 opens the ringing circuit when the handset is removed from the cradle.

FIG. 2 also shows the loudspeaker "on" key 208; a self-locking key which locks in the "on" position when depressed. As shown in FIG. 2, when the handset is left on the cradle and the loudspeaker "on" key is depressed contacts 203, 206 close the line loop; break-make contacts 204, 205 open the ringing circuit and complete the loop coupling the signals to the loudspeaker; make-before-break combination 206, 207 at contact 206 shunts the transmission equipment of substation 200 and, in conjunction with contact 203, closes the line loop, and at 207 extends power to the loudspeaking portion of the substation 200.

A loudspeaker "off" key is mechanically interlocked with the loudspeaker "on" key 208. Depressing the loudspeaker "off" key automatically releases the loudspeaker "on" key. In addition, a microphone muting button 403, shown in FIG. 4, is provided to mute the microphone; pressing muting button 403 short circuits the microphone. In this respect the present invention is a further development of the arrangement disclosed in the above-mentioned United States patent to Cleary et al.

FIG. 3 shows the electronic ringer 313. This electronic ringer 313 is a non-selective type which operates on all ringing frequencies, and a fairly wide range of ringing voltages. The loudspeaker of the loudspeaking portion of the telephone doubles as the transducer for the electronic ringer 313. Power for the electronic ringer is obtained by rectifying the ringing current transmitted over the line. A separate diode rectifier 315–318 is provided for the electronic ringer rather than using the diode rectifier provided for powering the loudspeaking portion of the system. A self-quenching Colpitts oscillator 319 is used to produce an audio-frequency tone interrupted at a slow rate, approximately 12 c.p.s., this tone, in addition, being subject to the interruptions of the ringing current received over the telephone line. Varistors 330, 331 provide a more stable voltage regulation, and thermistor 314 prevents the oscillator 319 from responding to the dial pulses.

Also shown in FIG. 3 is an electronic flasher 300 comprising neon lamp 312. The electronic flasher 300 serves to give a visual indication when the telephone is conditioned for loudspeaking operation. The operation of the electronic flasher is essentially the same as the electronic flasher disclosed in the above-mentioned U.S. patent to Cleary et al. and reference is made to that patent for the complete description of the operation of this flasher.

FIG. 3 also shows the power supply for the loud-speaking portion of the telephone; diode rectifier 302–305 maintains the bias voltages for all of the amplifiers in the loudspeaking portion of the system as well as the oscillator in the electronic flasher at the proper polarity irrespective of current reversal on the line circuit; coupling transformer 309 having primary and secondary windings 310, 311, respectively, couples the signals produced in the loudspeaking portion of substation 200 to the line L1.

The electronic ringer 313 and the electronic flasher 300 are both mounted on a printed circuit card which occupies a small area within the subset.

FIG. 4 shows the microphone 400; the microphone preamplifier 401 comprising single-stage transistor 407 having primary winding 405 of coupling transformer 404 connected in its collector output circuit; the microphone amplifier 408 comprising first-stage transistor 409 and capacitor-coupled therewith, second-stage transistor 410 having primary winding 414 of coupling transformer 413 connected in its collector output circuit; microphone control amplifier 423 comprising first-stage transistor 424 and capacitor-coupled therewith, second-stage transistor 425 having primary winding 427 of coupling transformer 426 connected in its collector output circuit. All of the above-mentioned transistors are PNP junction transistors used in grounded-emitter circuit arrangements.

Also shown in FIG. 4 is the resistance hybrid 417–420 which serves to keep the output of the microphone amplifier from reaching the input of the loudspeaker amplifier; the diode rectifier 429 and filter arrangement 430 rectify and filter the output of microphone control amplifier 423 to produce D.C. control signals.

FIG. 5 shows the loudspeaker 547; the loudspeaker amplifier 533 having the driver-stage comprising transistor 534 and the push-pull power-stage comprising transistors 536, 537 coupled to the last-mentioned stage by means of coupling transformer 538, and to the loudspeaker by means of coupling transformers 541, 544; loudspeaker control amplifier 528 comprising single-stage transistor 529 having primary winding 526 of coupling transformer 525 connected in its collector output circuit; circuit connection 530 coupling a part of the output signal of loudspeaker amplifier 533 to the loudspeaker control amplifier 528; diode rectifier 524 and filter arrangement **522*a* which rectify and filter the output of loudspeaker control amplifier 528 to produce D.C. control signals opposing those produced in the microphone channel; speaker volume control 531**. All of the amplifiers mentioned above are PNP junction transistors used in grounded-emitter circuit arrangements.

Also shown in FIG. 5 is the voice-switched control circuit 500. Series diodes 504, 505 and 506, 507 as well as resistance-capacitor parallel combination 502–503 and 508–509 form the microphone control portion of the voice-switched control circuit; diodes 513 and 514 and resistance-capacitor parallel combinations 511—512 and 515–516 form the loud-speaker control portion of the voice-switched control circuit; diode 501 protects the electrolytic capacitors used in the voice-switched control circuit and the above-mentioned filter arrangements. In addition, resistances 517, 519 in parallel with capacitors 518, 520, respectively, as well as the above-mentioned resistances provide paths whereby the capacitors may be discharged to ground when the diodes are in a substantially non-conducting state; thereby preventing these diodes from becoming conductive due to large amplitude control signals of short duration.

It may also be appreciated that resistances 502, 508 in the microphone control portion and resistances 511, 515 in the loudspeaker control portion of voice-switched control circuit 500 serve to limit the level of gain of the two channels.

In addition, it may be noted that all of the above-mentioned amplifiers in the loudspeaking portion of substation 200, the voice-switched control circuit 500 and the resistance hybrid 417–420 are all mounted on a printed circuit card arranged to be mounted in the telephone subset.

Referring now to FIG. 1, the loudspeaking portion of a voice switched loudspeaking telephone is shown in block diagram form. The operation of the system is briefly described as follows.

The loudspeaking portion of the system is shown having a microphone channel comprising microphone 400, microphone preamplifier 401, and microphone amplifier 408; a loudspeaker channel comprising loudspeaker 547 and loudspeaker amplifier 533; a microphone control amplifier 423; a loudspeaker control amplifier 528; a hybrid 417–420; a voice-switched control circuit 500; and power supply 302–305.

Under normal operating conditions with no signal in either channel, the loudspeaker amplifier 533 is at full gain and the microphone amplifier 408 is attenuated approximately 20DB. A signal in microphone channel will cause microphone amplifier 408 to operate at full gain and loudspeaker amplifier 533 to be attenuated approximately 20DB. A signal in the loudspeaker channel will help to keep that channel operating at full gain.

To illustrate the operation of the loudspeaking portion when transmission is in the outgoing direction, assume, for instance, that the local party is conversing with a distant party, not shown. Speech signals impressed on microphone 400 are amplified by microphone preamplifier 401 and coupled to microphone amplifier 408. These signals are not, however, immediately coupled to microphone amplifier 408 but are caused to "float" momentarily due to the operation of the voice-switched control circuit 500. It will be observed that, in addition to being coupled to microphone amplifier 408, part of the output signal from microphone preamplifier 401 is coupled to microphone control amplifier 423. Rectifier and filter means, not shown, in the output of microphone control amplifier 423 produce D.C. control signals effective to cause the voice-switched control circuit 500 to expand microphone amplifier 408 which then impresses the speech signals on hybrid 417–420. Hybrid 417–420 couples the speech signals to the telephone line L1. The D.C. control signals, in addition, cause voice-switched control circuit 500 simultaneously to compress loudspeaker amplifier 533.

The momentary delay caused by the "floating" of the signal before being coupled to microphone amplifier 408 assures that loudspeaker amplifier 533 is conditioned to a low gain before microphone amplifier 408 is conditioned to a high gain. This prevents the loop gain from ever becoming larger in the intermediate positions then in either of the end positions and singing due to the acoustic coupling of the two channels is prevented.

The operation when transmission is in the opposite direction is as follows: signals incoming to telephone line L1 are impressed on hybrid 417–420, coupled to the loudspeaker amplifier 533 and reproduced by loudspeaker 547. If loudspeaker amplifier 533 is at high gain the incoming signals will tend to keep the amplifier at a high gain. If, however, loudspeaker amplifier 533 is at a low gain, attenuating the incoming signals, the first few syllables may be clipped. To prevent this, and to provide for rapid gain increase of the loudspeaker amplifier 533, part of the output signal of loudspeaker amplifier 533 is coupled to the voice-switched control circuit 500 via conductor 530 and loudspeaker control amplifier 528. Rectifier and filter means, not shown, in the output of loudspeaker control amplifier 528 develop D.C. control signals opposing those derived from the microphone channel. These opposing D.C. signals, as will be explained, facilitate the gain increase of the loudspeaker amplifier 533 and clipping of the speech signals is prevented. Simultaneously with this gain increase of loudspeaker amplifier 533, microphone amplifier 408 is conditioned to a low state of gain.

FIGS. 2–5 show in detail a voice switched loudspeaking telephone as described above. Reference will now be made to these figures for a more detailed description of the components and the operation of these components to form a voice switched loudspeaking telephone.

*Detailed Description of the Operation*

The operation of the system by means of the handset will be described first. Assume that the subscriber at substation 200 desires to make an outgoing call using handset 209 shown in FIG. 2. On picking up handset 209, cradle-switch contacts 201, 202 close, as shown, to establish the following loop circuit, namely, battery through one winding of the line relay, not shown, in the central office, conductor 214 of L1, contact 201, impulse springs 215, line winding 218 of induction coil 217, transmitter 210, contact 207, conductor 213 of L1, other winding of line relay, not shown, and ground in the central office. Operation of the line relay causes the first numerical switch, for instance, the selector, not shown, in the central office to be connected to the line L1 in the well-known manner so that the subscriber receives dial tone.

The subscriber now dials the number of the desired party by repeatedly actuating his dial, whereby the loop circuit traced above is opened at impulse springs 215 one for each impulse. At dial shunt springs 216 short circuits are placed across transmitter 210, receiver 211, and induction coil 218 during each actuation of the dial. Resistance 226 and condenser 227, together with impulse springs 215, form a spark suppression circuit for the impulse springs 215.

After all digits have been sent the called subscriber's bell is rung in the usual manner and the last-mentioned subscriber answers the call by lifting the receiver at his substation, not shown. This causes the connector, not shown, in the central office to switch the connection through in a manner well-understood in the art so that the conversation between the two subscribers may begin.

It will be appreciated that transmitter 210 receives battery feed from the central office battery over the loop circuit traced above except that, at this time, battery and ground are fed through the line relay of the connector rather than that of the line circuit which is involved. Voice currents generated by transmitter 210 follow two parallel paths one of which extends over line L1 while the other is a local path which may be traced as follows: upper terminal of transmitter 210, FIG. 2, condenser 219, induction coil winding 220, balancing resistance 221 and, in multiple thereto, induction coil winding 222 and receiver 211, and back to the lower terminal of transmitter 210. Winding 222 is connected and designed to act as an anti-sidetone winding; as a result the voltage induced in winding 222 balances the voltage drop across resistance 221 for average line conditions so that no voice current traverses receiver 211. However, this receiver responds to voice currents incoming over line L1, namely due to signal voltages induced in induction coil winding 218 which gives rise to the flow of signal current in the following circuit: lower terminal of winding 220, FIG. 2, winding 222, receiver 211, transmitter 210, condenser 219, upper terminal of winding 220.

At the end of the conversation over line L1 the subscriber at substation 200 replaces handset 209, thereby opening the loop circuit at contacts 201, 202 and releasing the switching equipment in the central office.

If a call for substation 200 is incoming over line L1 the ringing current projected over the subscriber's line energizes the electronic ringer 313, FIG. 3.

The audio-frequency tone produced by the oscillator 319 is coupled by means of windings 324 and 325 of transformer 323 to transistor amplifier 326, the output of which is impressed on loudspeaker 547, FIG. 5, by way of the following path, namely, conductor 327, contacts 202, 205, conductor 228, winding 545 of coupling transformer 544, conductor 328, junction 329; winding 546 of transformer 544 couples the tone signals to loudspeaker 547.

The subscriber at substation 200, on hearing this tone, answers the call by removing handset 209. This completes the loop circuit to the central office and causes the transmission of ringing current to be discontinued and the connection to be switched through in the well-known manner. Transmission of voice frequencies from and to this substation subsequently takes place in the manner described above. At the end of the call the subscriber replaces his handset 209.

It will now be assumed that the subscriber at substation 200 wishes to set up a loudspeaking connection with another party. Accordingly, the subscriber depresses loudspeaker "ON" key 208, FIG. 2, without removing the handset. In depressing loudspeaker "ON" key 208, contacts 203 and 206 close to establish the following loop circuit, namely, battery through one winding of line relay, not shown, in the central office, conductor 214 of L1, contact 203, impulse springs 215, conductor 224, contact 206, right terminal of diode rectifier 302–305, FIG. 3, left terminal of diode rectifier 302–305, winding 310 of coupling transformer 309, conductor 213 of L1, other side of line relay, not shown, and ground in the central office. With the loop circuit complete, the subscriber now receives dial tone as previously described; the dial tone, however, is heard through loudspeaker 547, FIG. 5, in the same manner as voice signals transmitted over line L1, as will be described, rather than receiver 211, FIG. 2.

It may also be observed that at contact 207 the shunt which is normally across diode rectifier 302–305, FIG. 3, is removed; power from the central office is then extended to the loudspeaking portion of substation 200 by way of diode rectifier 302–305.

Electronic flasher 300, FIG. 3, comprising neon lamp 312 is energized to give a visual indication that the telephone is conditioned for loudspeaking operation.

Upon hearing dial tone, the subscriber may now dial the called party's number by correspondingly actuating the dial 212, FIG. 2, in the substation 200. This is made possible by the fact that impulse springs 215 of this dial are included, by way of conductors 223 and 224, in the loop circuit just traced. It will also be noted that contact 206 acts to place a short circuit across the transmission equipment of substation 200. This short circuit may be traced from the upper terminal of induction coil winding 218, FIG. 2, by way of conductor 224, contact 206, conductor 225 to the common terminal of transmitter 210 and receiver 211. By means of this short circuit the transmission equipment of substation 200 is thus kept from introducing a loss in the loop circuit with the system conditioned for loudspeaking operation.

Spark suppression for dial impulse springs in the instant case is provided by resistance 226 and condenser 227, FIG. 2. The closure of dial shunt springs 216 during each actuation of the dial is without effect with the system set up for loudspeaking operation.

After the connection to the distant party has been completed, the subscriber at substation 200 may begin conversing with the other party, namely, through his microphone 400, FIG. 4, and loudspeaker 547, FIG. 5. Signal voltages produced by microphone 400 are amplified by microphone preamplifier 401 and coupled to microphone amplifier 408 by means of coupling transformer 404. It may be observed that the secondary winding 405 of coupling transformer 404, FIG. 4, is extended by way of conductor 411 to the voice-switched control circuit 500 and by way of conductor 412 to the input of microphone amplifier 408. The amplified output signals appearing across winding 406 are not sufficient to cause series diodes 504, 505, or 506, 507, FIG. 5, to conduct to provide a path to ground and secondary winding 406 is caused to "float." Part of the amplified output signal is coupled to microphone control amplifier 423 by means of conductor 422, amplified and coupled by means of coupling transformer 426 to the diode rectifier 429 and filter arrangement 430; thereby producing a D.C. control signal. These D.C. control signals are extended to voice-switched control circuit 500 by means of differential input connection 433 and are sufficient to cause series diodes 504, 505 or 506, 507 to conduct and provide winding 406 a path to ground, namely, lower terminal of secondary winding 406, conductor 411, series diodes 504, 505, resistance 502—condenser 503 in parallel, resistance 517—condenser 518 in parallel, or alternately, depending upon the polarity of the input signals, series diodes 506, 507, resistance 508—condenser 509 in parallel, resistance 519—condenser 520 in parallel, ground indicated at 521, ground at lower terminal of resistance 409*a*, resistance 409*a*, conductor 412 to the upper terminal of secondary winding 406. When the above-mentioned path is established, the amplified output signals across secondary winding 405 are then coupled to microphone amplifier 408, and coupled by means of coupling transformer 413 to the resistance hybrid 417–420. The resistance hybrid 417–420 then couples the signals to the telephone line L1, this may be traced as follows: conductor 421, left-hand terminal of secondary winding 311 of coupling transformer 309, right-hand terminal of secondary winding 311, conductor 308, ground at the lower terminal of diode rectifier 302–305, ground at the left-hand terminal of resistance hybrid 417–420; the signal voltages induced across winding 310 of coupling transformer 309 are then transmitted to the called party over the loop circuit previously traced.

It may also be noted that the D.C. control signals extended to voice-switched control circuit 500 by way of differential input connection 433 will cause diode 513, or 514 to conduct; thereby shunting the input of loudspeaker 533 by providing a path to ground.

It may be observed that the microphone control portion of voice-switched control circuit 500 comprises two diode legs having series diodes 504, 505 and 506, 507, respectively, while the loudspeaker control portion comprises two diode legs having diodes 513 and 514, respectively. The two diodes in series assure that loudspeaker amplifier 533 is conditioned to a low state of gain before microphone amplifier 408 is conditioned to a high state of gain. This is true since more control signal is required to overcome the forward impedance of diodes 504, 505 or 506, 507, in series, than the single diode 513 or 514. This eliminates singing due to the acoustic coupling of the two channels since the loop gain can never become larger in the intermediate positions than in either of the end positions.

When the subscriber at substation 200 is finished speaking, the D.C. control signals derived from the microphone channel will not be sufficient to sustain conduction of series diodes 504, 505 or 506, 507 and diode 513 or 514. With these diodes non-conducting the ground path for secondary winding 405 of coupling transformer 404 is blocked and the shunt to ground on the input of loudspeaker amplifier 533 is opened; thereby causing microphone amplifier 408 and loudspeaker amplifier 533 to revert to their normal state, that is, loudspeaker amplifier 533 is at a high gain and microphone amplifier 408 is at a low gain.

Assume now that the called party is speaking. Signal voltages impressed on line L1 by means of his transmitter, not shown, are coupled by means of coupling transformer 309, FIG. 3, to the loudspeaking portion of substation 200 and are impressed on resistance hybrid 417–420, FIG. 4, this may be traced as follows: winding 310, FIG. 3, of coupling transformer 309 over the loop circuit established above, left terminal of winding 311, conductor 421, upper terminal of resistance hybrid 417–420, FIG. 4, ground at left-hand terminal of resistance hybrid 417–420, ground at the lower terminal diode rectifier 302–305, FIG. 3, conductor 308, and right terminal winding 311. The signal voltages are then coupled to loudspeaker amplifier 533, amplified and reproduced by loudspeaker 547.

It may also be observed that a portion of the output signal of loudspeaker amplifier 533 is coupled by means of conductor 530 to loudspeaker control amplifier 528, amplified and coupled by means of coupling transformer 525 to diode rectifier 524 and filter arrangement 522*a*; thereby producing D.C. control signals of opposite polarity than the above-mentioned D.C. control signals derived from the microphone channel. These D.C. control signals are extended to voice-switched control circuit 500 by means of differential input connection 510 and help to prevent diodes 504–507 and diodes 513–514 from being rendered conductive; thereby keeping loudspeaker amplifier 533 expanded.

To further illustrate the action of voice-switched control circuit 500, assume now that the subscriber at substation 200 is talking and the distant party wishes to break into the conversation. The control exercised by voice-switched control circuit 500 allows break-in to occur, that is, exclusive holding of the microphone channel or the loudspeaker channel does not exist and either party may break into the conversation at any time.

Under the conditions assumed, microphone amplifier 408 is conditioned to a high state of gain and loudspeaker amplifier 533 is at a low state of gain. The signal voltages impressed on line L1 by means of the distant party's transmitter are coupled to loudspeaker amplifier 533 and reproduced by loudspeaker 547 in the manner previously described.

A portion of the output signal of loudspeaker amplifier 533 is coupled to loudspeaker control amplifier 528 and D.C. control signals opposing the D.C. control signals derived from the microphone channel are again produced as described above. These D.C. control signals are extended to voice-switched control circuit 500 by means of differential input connection 510.

Since the party who wishes to break into a conversation usually raises his level of speaking, a sufficient amount of D.C. control signal will be derived from the output of loudspeaker amplifier 533, even though it is at a low gain, to counteract the D.C. control signals derived from the microphone channel. It may be observed that the greater forward impedance of series diodes 504, 505 or 506, 507 will cause them to be rendered non-conductive before diode 513 or 514; a larger sustaining voltage is required to keep series diodes 504, 505 or 506, 507 conducting than the single diode 513 or 514. When series diodes 504, 505 or 506, 507 are rendered non-conductive the ground path for secondary winding 406, FIG. 4, is blocked, thereby causing microphone amplifier 408 to be conditioned to a low state of gain. Similarly, when diode 513 or 514 is rendered non-conductive the shunt path to ground is opened and loudspeaker amplifier 533 is caused to increase in gain.

It may also be noted that break-in may occur even if the distant party does not raise his level of speaking a substantial amount. The regenerative action previously described facilitates the break-in by continuously supplying the D.C. control signals to voice-switched control circuit 500. If the subscriber at substation 200 then pauses break-in may occur, or, if he does not pause long enough for the break-in to occur, when capacitors 509, 516 have accumulated a sufficient amount of charge to render series diodes 504, 505 or 506, 507 and diode 513 or 514 non-conductive as described above, break-in will occur.

The action of voice-switched control circuit 500 is similar when the subscriber at substation 200 wishes to break into the conversation.

Condenser 431, resistance 432, and the combined impedance presented by the resistive and capacitive components of voice-switched control circuit 500 have a sufficiently large decay time constant to bridge the gaps during the momentary pauses in conversation and between word syllables. The charge time constants of diode 429, condenser 431, and coupling transformer 426 in the microphone channel, and diode 524, condenser 523, and coupling transformer 525 in the loudspeaker channel are made short minimizing the clipping of speech signals. In addition, the regenerative action previously described facilitates the increase in gain of loudspeaker amplifier 533. Thus, a much more rapid gain increase is obtained than under ordinary conditions.

The following are representative values for the components used in the diode rectifiers, the filter arrangements, and the voice-switched control circuit disclosed in this embodiment:

| | | |
|---|---|---|
| Diodes | | |
| **429** | | T12G |
| **501** | | T12G |
| **504** | | T12G |
| **505** | | T12G |
| **506** | | T12G |
| **507** | | T12G |
| **513** | | T12G |
| **514** | | T12G |
| **524** | | T12G |
| Resistances | | |
| **432** | ohms | 10,000 |
| **502** | do | 10,000 |
| **508** | do | 10,000 |
| **511** | do | 10,000 |
| **515** | do | 10,000 |
| **517** | do | 10,000 |
| **519** | do | 10,000 |
| **522** | do | 10,000 |
| Condensers | | |
| **431** | microfarads | 50 |
| **503** | do | 2 |
| **509** | do | 2 |
| **512** | do | 2 |
| **516** | do | 2 |
| **518** | do | 8 |
| **520** | do | 8 |
| **523** | do | 50 |

As a further example, assume that the subscriber at substation 200 receives a call and desires to answer it using the loudspeaking portion of the subset. The ringing current projected over line L1 energizes the electronic ringer 313 and ringing tone is heard over the loudspeaker 547, FIG. 5, in the manner previously described. On hearing this tone the subscriber at substation 200 depresses the loudspeaker "on" key 208, FIG. 2. When loudspeaker "on" key 208 is depressed, contacts 203, 206 close to complete the loop to the central office causing the transmission of ringing current to be discontinued and the connection to be switched through in the well known manner; contact 206 also serves to shunt the transmission equipment in the subset; contact 207 opens to extend power to the loudspeaker portion of the subset in the manner described above; neon lamp 312, FIG. 3, flashes to give a visual indication that the subset is conditioned for loudspeaking operation; and break-make contacts 204, 205 open the ringing circuit and complete the loop coupling the signals to loudspeaker 547, FIG. 5. Transmission of voice frequencies from and to this substation subsequently takes place in the manner previously described.

As a final example, assume now that the subscriber at substation 200, after a connection has been established, wishes to switch from loudspeaking operation to handset operation, or from handset operation to loudspeaking operation.

To switch from loudspeaking operation to handset operation the subscriber at substation 200 must first pick up handset 209 before releasing loudspeaker "on" key 208. When the handset 209 is removed from the cradle, cradleswitch contact 201 closes and places dial impulse springs 215, FIG. 2, in parallel with the loudspeaking portion of the subset. The transmission equipment of the subset is, however, short-circuited at contact 206 and the loudspeaker "on" key 208 must be released before handset operation is possible. This arrangement assures that the subscriber at substation 200 will not leave the subset conditioned for loudspeaking operation after he has completed the call using handset 209.

In switching from handset operation to loudspeaking operation, the above procedure is just the reverse. The subscriber at substation 200 must first depress loudspeaker "on" key 208 to establish the parallel connection mentioned above and then place handset 209 on the cradle.

While only certain embodiments of the invention have been illustrated and described, it is to be understood that numerous modifications in the details of arrangement may be resorted to without departing from the true spirit and scope of the invention as defined in the appended claims.

What is claimed is:

1. A loudspeaking telephone system having a line, a transmitting channel comprising a microphone and a microphone amplifier, a receiving channel comprising a loudspeaker and a loudspeaker amplifier, and a control circuit comprising a diode-capacitor bridge; said bridge having two input connections which respectively extend, from said two channels to the two terminals of one diagonal of said bridge, rectifier means being included in said input connections for deriving two direct current control signals from the voice signals in said two channels respectively, said bridge including three pairs of legs, each pair extending between said two terminals, the first pair of legs including two diodes in series, the second pair of legs including two pairs of diodes in series and the third pair of legs including a pair of serially connected capacitors; and said bridge having two output connections for controlling said receiving and transmitting channels respectively, the first-mentioned output connection extending across another diagonal of said bridge which interconnects the junction of said pair of capacitors and the junction of said two diodes, and the second-mentioned output connection extending across yet another diagonal which interconnects the junction of said pair of capacitors and the junction of said two pairs of diodes, whereby the gain of one of said channels is automatically increased and the gain of the other said channel is automatically decreased as a substantially continuous function of the difference of said two control signals.

2. A loudspeaking telephone system, as claimed in claim 1, wherein said first output connection is shunt connected to said receiving channel to cause the shunt impedance of said channel to be varied in a predetermined sense and wherein said second output connection is series connected to said transmitting channel to cause the series impedance of the last-mentioned channel to be varied in the same sense, whereby the gain of the receiving channel is automatically decreased and the gain of the transmitting channel automatically increased as a substantially continuous function of said difference.

3. A loudspeaking telephone system, as claimed in claim 1, wherein there is provided a by-pass resistance across each of the capacitors of said diode-capacitor bridge, said resistances providing discharge paths for said capacitors when the diodes of said bridge are in substantially non-conducting state, and said discharge paths substantially preventing a cumulative build-up of charges on said capacitors and thereby preventing said bridge from becoming conductive due to large-amplitude control signals of short duration.

4. In a telephone system having a transmitting channel and a receiving channel, a control circuit having an input end and an output end, two input connections respectively extending from said two channels and differentially connected to said input end, and two output connections respectively extending to said two channels from said output end, said control circuit comprising a diode-capacitance bridge arrangement including a pair of capacitance legs common to both said channels and two pairs of diode legs for control of said transmitting channel and said receiving channel respectively, said two pair of diode legs respectively causing the series impedance of one of said channels and the shunt impedance of the other said channel to vary in the same sense.

5. In a telephone system, the combination as claimed in claim 4, wherein one pair of said diode legs comprises diode means having a larger forward voltage drop than the other pair of said diode legs whereby the gain of one of said channels is decreased before the gain of the other said channel is increased.

6. In a telephone system, the combination as claimed in claim 4, wherein each leg of a first pair of said diode legs comprises two diodes in series arrangement whereas each of the other pair of diode legs includes only one such diode.

7. A loudspeaking telephone system including a line, a transmitting channel comprising a microphone and microphone amplifier means, a receiving channel comprising a loudspeaker and loudspeaker amplifier means, and a control circuit comprising a diode-capacitance bridge having differentially connected input connections from said transmitting and receiving channels and output connections to said microphoe amplifier means and to said loudspeaker amplifier means, said diode-capacitance bridge including two pairs of diode legs for controlling the gain of said two channels in response to the difference in voice-controlled signals received by way of said input connections and including a pair of capacitance legs common to both said channels, said control circuit automatically and regeneratively increasing the gain of said receiving channel by way of said connections between said receiving channel and said control circuit as a substantially continuous function of said voice controlled signals.

8. A loudspeaking telephone system, as claimed in claim 7, wherein said input connections from both said microphone channel and said receiving channel include control amplifier means, and rectifier and filter means connected to said control amplifier means to provide direct current control signals.

9. A loudspeaking telephone system, as claimed in claim 8, wherein all of said amplifier means are transistor amplifiers, and wherein means are provided for powering all of said transistor amplifiers over said line.

10. A loudspeaking telephone system, as claimed in claimed 8, wherein means having a large decay time are included in said input connection from said microphone channel to prevent the gain of said channel from decreasing to a low state during conversation, the means for regeneratively increasing the gain of said receiving channel acting to overcome said large decay time so as to allow an immediate gain increase in said receiving channel when a voice signal is received over said last-mentioned channel.

References Cited in the file of this patent

UNITED STATES PATENTS

| | | |
|---|---|---|
| 2,282,405 | Herrick | May 12, 1942 |
| 2,332,430 | Berger | Oct. 19, 1943 |
| 2,468,205 | Kellogg | Apr. 26, 1949 |
| 2,885,478 | Cerofolini | May 5, 1959 |
| 3,022,379 | Soderbaum | Feb. 20, 1962 |
| 3,046,354 | Clemency | July 24, 1962 |

FOREIGN PATENTS

| | | |
|---|---|---|
| 509,613 | Great Britain | July 19, 1939 |
| 665,274 | Great Britain | Jan. 23, 1952 |
| 858,678 | Great Britain | Dec. 30, 1957 |

OTHER REFERENCES

Olsen, "Elements of Acoustical Engineering," 2nd ed. (pages 446–447 relied upon).